United States Patent
Troulis et al.

(10) Patent No.: US 7,668,199 B2
(45) Date of Patent: Feb. 23, 2010

(54) METHODS AND SYSTEMS FOR COMMUNICATING USING TRANSMITTED SYMBOLS ASSOCIATED WITH MULTIPLE TIME DURATIONS

(75) Inventors: Markos G. Troulis, San Diego, CA (US); Arndt Joseph Mueller, San Diego, CA (US); Karl E. Fitzke, Ithaca, NY (US)

(73) Assignee: Texas Instruments Incorporated, Dallas, TX (US)

( * ) Notice: Subject to any disclaimer, the term of this patent is extended or adjusted under 35 U.S.C. 154(b) by 982 days.

(21) Appl. No.: 10/870,404

(22) Filed: Jun. 17, 2004

(65) Prior Publication Data

US 2005/0281292 A1 Dec. 22, 2005

(51) Int. Cl.
H04J 3/16 (2006.01)
H04J 3/06 (2006.01)

(52) U.S. Cl. ................................. 370/467; 370/516

(58) Field of Classification Search .................. 370/464, 370/465, 466, 467, 503, 507, 509, 512, 513, 370/516, 517, 518, 519
See application file for complete search history.

(56) References Cited

U.S. PATENT DOCUMENTS

| 5,187,719 | A | * | 2/1993 | Birgenheier et al. | 375/226 |
|---|---|---|---|---|---|
| 5,287,067 | A | * | 2/1994 | Denno et al. | 329/304 |
| 5,896,427 | A | * | 4/1999 | Muntz et al. | 375/372 |
| 6,961,393 | B1 | * | 11/2005 | Cupo et al. | 375/343 |
| 7,423,989 | B2 | * | 9/2008 | Hansen et al. | 370/328 |
| 2002/0181509 | A1 | * | 12/2002 | Mody et al. | 370/480 |
| 2003/0072452 | A1 | * | 4/2003 | Mody et al. | 380/274 |
| 2003/0147655 | A1 | | 8/2003 | Shattil | |
| 2004/0004934 | A1 | | 1/2004 | Zhu et al. | |
| 2004/0120412 | A1 | * | 6/2004 | Banerjea | 375/260 |
| 2004/0264584 | A1 | * | 12/2004 | Labs et al. | 375/260 |

* cited by examiner

*Primary Examiner*—Seema S Rao
*Assistant Examiner*—Christine Duong
(74) *Attorney, Agent, or Firm*—Steven A. Shaw; W. James Brady; Frederick J. Telecky, Jr.

(57) ABSTRACT

In at least some embodiments, a system may comprise one or more devices configurable to communicate according to a first protocol that permits interpretation of transmitted symbols associated with a first time duration. The system may further comprise one or more devices configurable to communicate according to a second protocol that permits interpretation of transmitted symbols associated with multiple time durations. The one or more devices configurable to communicate according to the second protocol are operable to communicate using transmitted symbols associated with the first time duration and to communicate using transmitted symbols associated with a time duration that is not supported by the one or more devices configured to communicate according to the first protocol.

19 Claims, 3 Drawing Sheets

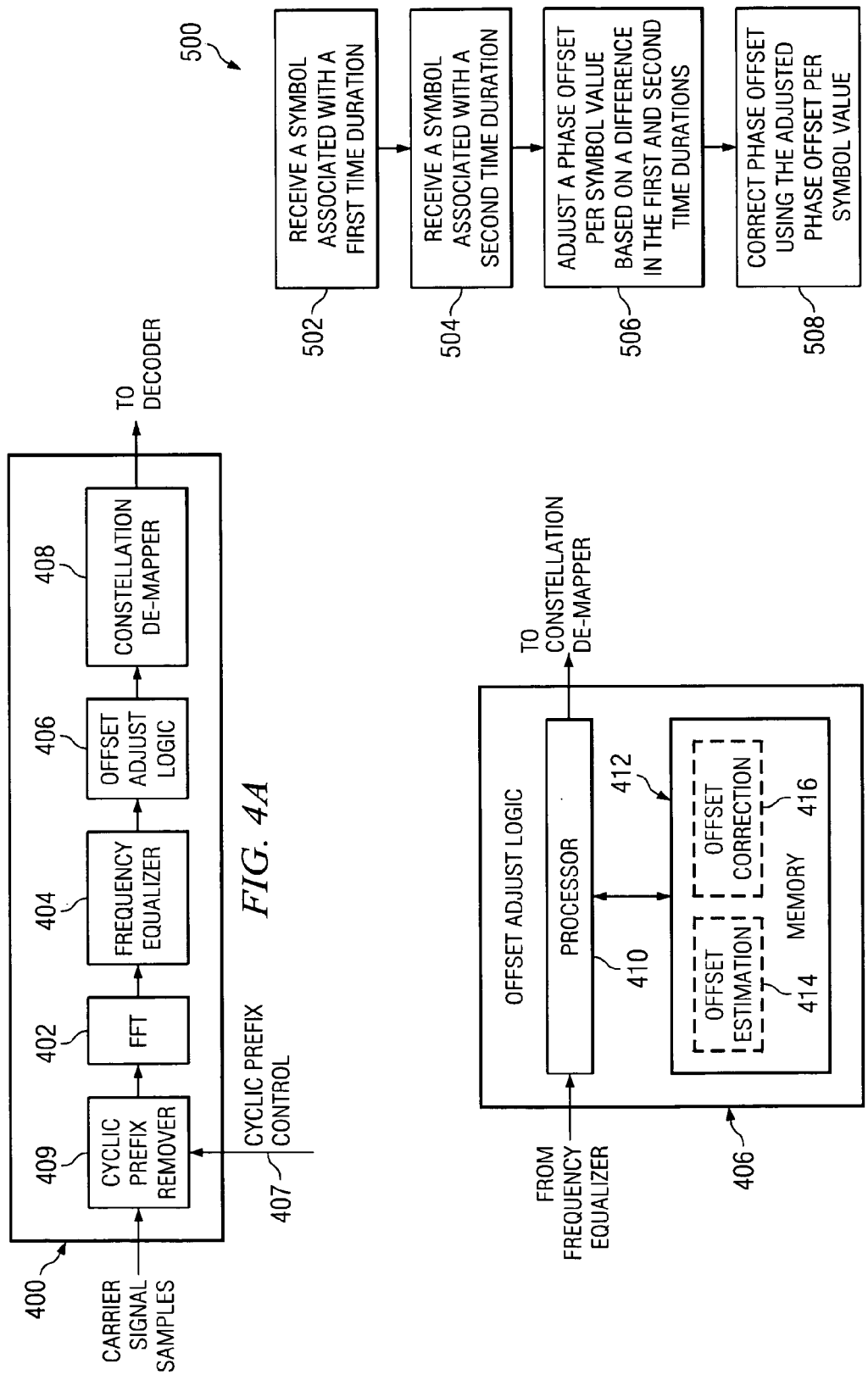

METHODS AND SYSTEMS FOR COMMUNICATING USING TRANSMITTED SYMBOLS ASSOCIATED WITH MULTIPLE TIME DURATIONS

BACKGROUND

In order for electronic devices to communicate, a wireless or wired protocol (i.e., standard) may be used to define hardware and software parameters such that the devices are able to send, receive, and interpret data. For example, the 802.11 family of standards is provided by the Institute of Electrical and Electronics Engineers (IEEE) and describes, among other features, medium access control (MAC) and physical layer (PHY) specifications that may be used to implement wireless local area networks (WLANs).

Some wired and wireless protocols define a guard interval (e.g., 0.8 μs) that prefixes transmitted information symbols. The guard interval reduces interference between information symbols by providing time for multi-path reflections of a previously transmitted symbol to attenuate. However, using a fixed guard interval to prefix each information symbol may unnecessarily and undesirably increase data transmission duration implying a reduced data rate. Therefore, devices that implement a plurality of guard interval lengths (e.g., long interval, medium interval, and short interval) and/or selectively switch between implementing a guard interval and not implementing a guard interval are desirable. Additionally, devices that are able to correctly interpret transmitted information symbols prefixed by different guard interval lengths are desirable.

SUMMARY

In at least some embodiments, a system may comprise one or more devices configured to communicate according to a first protocol that permits interpretation of transmitted symbols associated with a first time duration. The system may further comprise one or more devices configured to communicate according to a second protocol that permits interpretation of transmitted symbols associated with multiple time durations. The one or more devices configured to communicate according to the second protocol are operable to communicate using transmitted symbols associated with the first time duration and to communicate using transmitted symbols associated with a time duration that is not supported by the one or more devices configured to communicate according to the first protocol.

BRIEF DESCRIPTION OF THE DRAWINGS

For a detailed description of various embodiments of the invention, reference will now be made to the accompanying drawings in which:

FIG. 4A illustrates a wireless receiver in accordance with preferred embodiments of the invention;

FIG. 4B illustrates offset adjust logic of the receiver of FIG. 4A in accordance with preferred embodiments of the invention; and FIG. 5 illustrates a method in accordance with preferred embodiments of the invention.

NOTATION AND NOMENCLATURE

Figure 1:
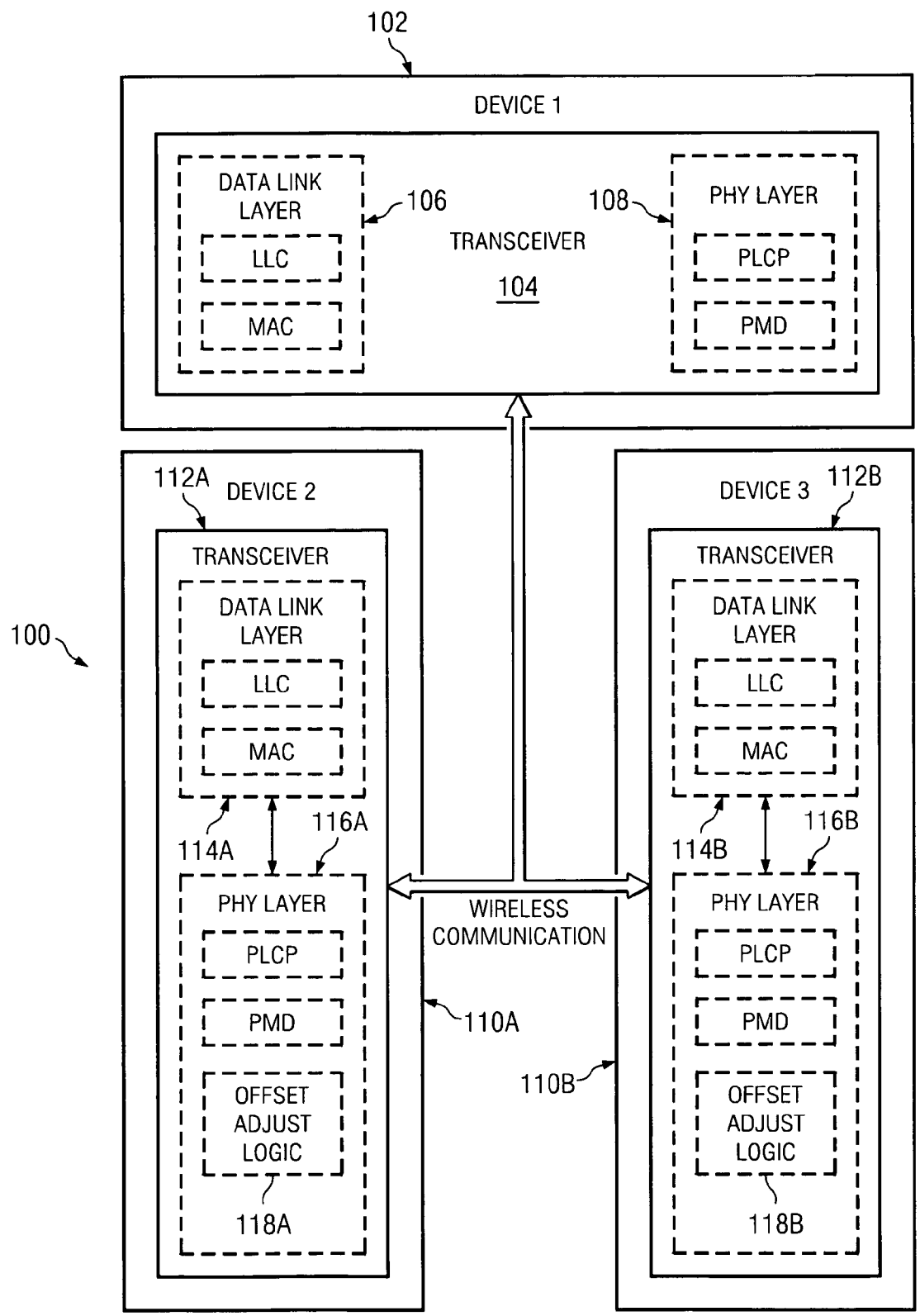
FIG. 1 illustrates a wireless system in accordance with preferred embodiments of the invention.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

Electronic devices that communicate wirelessly may use a variety of techniques to prepare, send, receive, and recover data. For example, data preparation techniques may comprise data scrambling, error correction coding, interleaving, data packet formatting, and/or other techniques. The data to be transmitted may be first converted into bits which have been appropriately prepared (see data preparation above). These bits may be split into blocks of various lengths. Each block of bits is associated with a complex amplitude from a constellation. In this stream of complex amplitudes, the modulator may insert at specific positions some additional complex amplitudes that may be associated with synchronization or other important aspects of the transmission.

If the transmitting device is using N sub-carriers to transmit information, then the total number of complex amplitudes (K) is an integer multiple of the number of subcarriers (N). The first N complex amplitudes may enter an inverse Discrete Fourier Transform (IDFT) module whereby a new set of N complex amplitudes is obtained. The subcarriers modulated from the information bits may comprise this set of N complex amplitudes which is herein referred to as a modulated "information symbol."

Finally, the last q elements of the modulated information symbol are appended at the beginning of the symbol (as a prefix), where q is the length of the Guard Interval expressed in samples. If the time interval between two adjacent complex amplitudes is Ts, then the duration of the information symbol is N*Ts, and the duration of the guard interval is q*Ts. The combination of the information symbol and its associated guard interval is referred to herein as the "transmitted symbol" and its duration is (q+N)*Ts.

The resulting transmitted symbol comprises a set of N+q complex amplitudes that are further prepared for transmission (e.g., using digital to analog conversion, modulation to a carrier radio frequency for wireless transmission, or straight transmission in a wire or cable). In a multi-carrier transmission as described above, the number of complex amplitudes composing an information symbol is constant and equal to N. As described herein, embodiments of the invention may implement information symbols associated with N complex amplitudes and transmitted symbols having varied lengths. The length of the transmitted symbol may vary due to changes in guard interval length.

For example, in 802.11a compliant systems, the information symbol includes N=64 complex amplitudes and the guard interval includes q=16 complex amplitudes, yielding a total of 80 complex amplitudes for the transmitted symbol. The time duration Ts mentioned previously is the time period by which each complex amplitude is clocked in the digital to analog converter for transmission into the physical medium. This time period is referred to herein as the transmitting device's sample period and the quantity fs=1/Ts is referred as the transmitter's sample frequency.

As an illustration, a transmitting device may implement 8 sub-carriers, each of angular frequency $\omega_k=2*\pi*k*fs/8$, (k=0, 1, . . . , 7), to send 8-bits of data at a time and a guard interval of length q=3 samples. Assuming the transmitting device is using an antipodal constellation (e.g., a constellation that associates the bit value "1" with the value A(1)=1 and the bit value "0" with the value A(0)=−1 or vice versa). The k-th bit is therefore associated with the signal A(k-th bit)*cos ($\omega_k$*t) and the sum of all those 8 signals is transmitted for a duration of T=(8+3)*Ts=11*Ts seconds (T is the transmitted symbol duration). The operation is repeated for the next 8 bits of data, and so on, until all the bits are transmitted.

To receive data, one or more antennas may "pick up" the wireless signal, after which data may be recovered by sampling the received signal and decoding each information symbol. To recover data, a receiving device may implement techniques such as signal amplification, digitization, sample rate conversion, equalization, demodulation, de-interleaving, decoding, and/or de-scrambling.

The processes of preparing, sending, receiving, and recovering data as described above may be organized to permit multiple devices to interactively communicate in real-time. During this interaction between multiple devices, it may be desirable to transmit information symbols having different lengths (i.e., durations). For example, the data transfer rate of a wireless system may increase by reducing the guard interval length of at least some transmitted symbols and/or by eliminating guard intervals (i.e., by reducing the time delay between information symbols).

To decode information symbols, the receiver samples the incoming signal at a rate (hereafter called the receiver's sampling rate) that is the same as the rate at which the samples are clocked out of the transmitter. Although no sampling occurs at the transmitter the clocking rate will be referred to herein as the transmitter's sampling rate. If the receiver's sampling rate and the transmitter's sampling rate are different, a sampling frequency offset exists. The frequency offset causes the transmitted and the received symbols to have different durations thereby causing the sub-carriers to eventually lose orthogonality and causing loss of data. In the frequency domain the difference in the transmitter and receiver sampling frequencies yields a phase offset that grows as an affine transform of the index of the transmitted symbol (that is, of the form i*A+B, where A and B are parameters related to the sampling frequency offset). When the length of each transmitted symbol is fixed, but there is a sampling frequency offset, there is a phase offset (in frequency domain) that is affecting the output of the receiver's FFT. This linear phase offset can be easily computed and compensated for in the receiver. However, if transmitted symbols of multiple lengths are used to transmit data, the phase shift between subsequent information symbols changes such that fixed compensation schemes are not effective.

Embodiments of the invention preferably provide systems and methods that estimate and correct varying timing offsets and/or varying phase shift offsets that occur between information symbols associated with different guard interval lengths. Such embodiments may allow at least some devices of a wireless system to communicate using multiple guard interval lengths. Also, preferred embodiments may allow the devices that implement multiple guard interval lengths to communicate with devices that do not implement multiple guard interval lengths and vice versa.

FIG. 1 illustrates a wireless system 100 in accordance with an exemplary embodiment of the invention. As shown in FIG. 1, the wireless system 100 may comprise the devices 102, 110A, and 110B. The device 102 may comprise a transceiver 104 having a data link layer 106 and a physical (PHY) layer 108. In at least some embodiments, the device 102 may implement a first wireless protocol (e.g., 802.11a, 802.11g). Similarly, each of the devices 110A and 110B also may comprise a transceiver 112A, 112B having a data link layer 114A, 114B and a PHY layer 116A, 116B. In at least some embodiments, the devices 110A and 110B may implement a second wireless protocol (e.g., 802.11 n).

In order for the devices 102, 110A, and 110B to communicate wirelessly, the PHY layers 108, 116A, 116B and the data link layers 106, 114A, 114B may perform several functions such as preparing, transmitting, receiving, and decoding wireless signals. For example, the PHY layers 108, 116A, 116B may each implement a physical layer convergence procedure (PLCP) sub-layer and a physical medium dependent (PMD) sub-layer. The PLCP sub-layer may provide an interface whereby carrier sense and clear channel assessment (CCA) signals are provided to the data link layer 106, 114A, 114B indicating whether the PHY layer 108, 116A, 116B is in use. The PMD sub-layer may provide encoding, decoding, modulation, and/or demodulation of wireless signal information symbols. For example, the PMD sub-layer may permit the devices 102, 110A, 110B to implement modulation techniques such as Orthogonal Frequency Division Multiplexing (OFDM). The PMD sub-layers also may provide analog-to-digital and/or digital-to-analog data conversion.

The data link layers 106, 114A, 114B may implement a logical link control (LLC) and a medium access control (MAC). During transmission of data, the LLC may assemble data into a frame with address and cyclic redundancy check (CRC) fields. During reception of data, the LLC may disassemble a data frame, perform address recognition, and perform CRC validation. The MAC may function, at least in part, to coordinate transmission of data between the electronic devices 102, 110A, and 110B.

As shown in FIG. 1, the PHY layers (116A, 116B) of the devices 110A and 110B also may comprise offset adjust logic 118A, 118B. The offset adjust logic 118A, 118B may permit the devices 110A and 110B to estimate and compensate for phase offsets or timing offsets (or both) that occur between the carrier frequencies and/or the sampling frequencies of different devices 102, 110A and 110B. As used herein, a carrier frequency refers to the frequency at which the spectrum of the baseband signal (signal conveying information) is centered (e.g., the carrier signal may equal to 2.4 GHz or 5.4 Ghz) and a sampling frequency refers to the frequency associated with the original band (baseband) of frequencies of a signal (e.g., 20 MHz, 40 MHz or 80 MHz) before it is modulated for transmission at a higher frequency.

As mentioned above, preferred embodiments may allow devices (e.g., the devices 110A and 110B) that implement multiple guard interval lengths to communicate with devices (e.g., the device 102) that do not implement multiple guard interval lengths and vice versa. Accordingly, all of the devices 102, 110A, and 110B may transmit and interpret information symbols according to the communication protocol implemented by the device 102. This communication protocol may implement a predetermined guard interval (hereafter referred to as "the legacy interval") as a prefix for each information symbol. To transmit and interpret information symbols prefixed with the legacy interval, each of the devices 110A and 110B may operate in a first mode.

Additionally, each of the devices 110A and 110B may operate in a second mode. For example, the second mode may be activated when the device 110A intends to transmit a "data field" of a data packet to the device 110B or vice versa. When configured in the second mode, the devices 110A and 110B are preferably operable to prefix some information symbols with the legacy interval and prefix other information symbols with a guard interval that is shorter than the legacy interval. For example, the devices 110A and 110B may prefix one or more information symbols with the legacy interval when the information symbols are associated with a "signal field" of a data packet. By prefixing one or more information symbols of the signal field with the legacy interval, the device 102 may interpret the information of the signal field and, at least, calculate a duration of data transmission between the devices 110A and 110B. For more information regarding how wireless devices that implement different protocols may coexist, reference may be made to U.S. Ser. No. 10/744,864, filed Dec. 23, 2003 and entitled "METHODS AND SYSTEMS FOR MULTI-PROTOCOL COMMUNICATION," which is hereby incorporated by reference.

Still referring to operation while in the second mode, after transmitting the one or more information symbols prefixed by a guard interval (e.g., the legacy interval) and associated with the signal field, the devices 110A and 110B may communicate with information symbols that are prefixed by shorter guard intervals (i.e., shorter than the legacy interval). The information symbols having shorter guard intervals may be associated with, at least, a data field of a data packet. Because the data is intended for one of the devices 110A and 110B, the capabilities of the device 102 do not need to be considered. However, the intended recipient device of the data field needs to accurately interpret information symbols associated with the shorter guard interval. Therefore, the devices 110A and 110B may implement offset adjust logic 118A, 118B to compensate for the change in guard interval length.

Additionally, the devices 110A and 110B may operate in a third mode. In the third mode, the devices 110A and 110B may transmit some information symbols prefixed with a first time interval and other information symbols prefixed with a second time interval, where neither the first time interval nor the second time interval is the legacy interval described above.

In both the second and third modes, the devices 110A and 110B may switch the length of guard intervals in real-time with little or no delay (i.e., a first information symbol may be prefixed by a first guard interval and a subsequent information symbol may be prefixed by a second guard interval). Additionally, the devices 110A and 110B may switch back and forth between multiple guard intervals. For example, the devices 110A and 110B may transmit and/or receive training sequences with information symbols each prefixed by a first guard interval length, then a signal field with information symbols each prefixed by a second guard interval length, then a data field with information symbols each prefixed by a third guard interval length. The first, second and third guard interval lengths may each be distinct.

Figure 2:
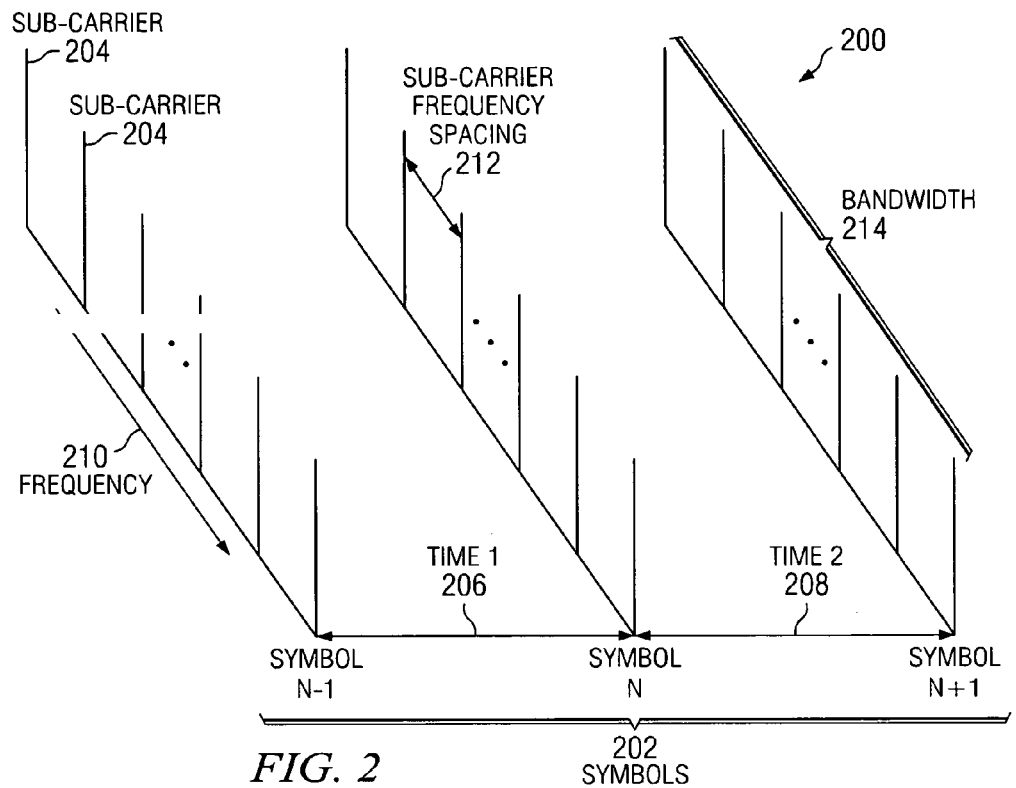
FIG. 2 is a graphic illustration of transmitting information symbols in accordance with embodiments of the invention.

FIG. 2 illustrates a diagram 200 of a transmission of information symbols 202 in accordance with embodiments of the invention. As shown in FIG. 2, the symbols 202 may each comprise a plurality of sub-carriers 204. The sub-carriers 204 of each symbol 202 are separated from each other according to a sub-carrier frequency spacing 212. The sub-carrier frequency spacing 212 preferably allows a maximum number of sub-carriers 204 over a bandwidth 214 without causing unacceptable interference between the sub-carriers 204. However, embodiments of the invention may implement symbols 202 having any functional sub-carrier frequency spacing 212 and any number of sub-carriers 204.

As shown in FIG. 2, a symbol "SYMBOL N" may be transmitted an amount of time "TIME1" 206 after a symbol "SYMBOL N−1" is transmitted. Additionally, a symbol "SYMBOL N+1" may be transmitted an amount of time "TIME2" 208 after SYMBOL N is transmitted. In at least some embodiments, the TIME1 206 and the TIME2 208 may be representative of guard intervals, which differ in length. For example, the difference between TIME1 206 and TIME2 208 may be representative of when SYMBOL N implements a longer guard interval than SYMBOL N+1.

In at least some embodiments, a transmitting device may implement any of a variety of sampling frequencies to encode information symbols. If a sampling frequency of 20 MHz is implemented, the time period to transmit 64 modulated complex tones (e.g., an OFDM symbol) may be 3.2 μs (i.e., 64*1/20 MHz). In addition, a guard interval comprising, for example, 0.8 μs (i.e., 16 clock periods at 20 MHz) or 0.4 μs (i.e., 8 clock periods at 20 MHz) may prefix each OFDM symbol to prevent or reduce inter-symbol interference. The clock periods applied during the guard interval may be used to repeat values of the ODFM symbol in order to have a quasi-periodic signal at the input of the channel. Assuming the channel duration does not exceed the duration of the Guard Interval, the output of the channel may look like a cyclic convolution process instead of a linear convolution. Therefore, when a 20 MHz sampling frequency is implemented, an OFDM symbol with a 0.8 μs guard interval prefix may have a duration of 4.0 μs and may be described by 80 clock periods (i.e., 64 complex amplitudes plus 16 complex amplitudes). While OFDM symbols may be used in exemplary embodiments, the invention is not limited to OFDM symbols.

As described previously, a receiving device may implement the same sample frequency as the transmitting device in order to maintain orthogonality between the subcarriers used to convey the information symbols. Therefore, if the transmitter device's sample frequency is 20 MHz, the receiving device's sample frequency also may be 20 MHz. In exemplary embodiments, in which OFDM information symbols are transmitted (each prefixed by a 0.8 μs guard interval) the receiving device may sample the carrier signal 80 times over a span of 4.0 μs to decode each complex amplitude of an OFDM symbol. The repeated complex amplitudes described above may be thrown out, or otherwise ignored, by the receiving device.

To compensate for sample rate and carrier frequency offsets, the receiving device may determine an initial phase offset and compensate for the initial phase offset accordingly. Additionally, the receiving device may estimate a phase offset per transmitted symbol value as will be described below. In at least some embodiments, the initial phase offset may be determined as the initial difference between a first phase vector associated with constellation points representing the OFDM symbol at the transmitting device and a second phase vector associated with constellation points representing the same OFDM symbol at the receiving device.

The receiving device may compensate for duration offsets between sampling frequency clock periods and carrier frequency clock periods by periodically tracking and compensating for the rotation of constellation points at the receiving device. The frequency at which the rotation of the second phase vector may be tracked and compensated for will hereafter be called the "integration period." In at least some embodiments, the integration period may correspond to the number of clock cycles associated with sampling each transmitted symbol (including the information symbol and guard interval). For example, if the receiving device samples the carrier signal 80 times to decode each transmitted symbol, the integration period may be once every 80 samples.

If the transmitting device changes the guard interval in real-time or "on the fly," the receiving device should also change the integration period. Otherwise, orthogonality between the subcarriers may be lost. As an example, suppose a transmitting device transmits an OFDM symbol prefixed by a first guard interval using 80 sample clock cycles. Subsequently, the transmitting device transmits each OFDM symbol prefixed by a second guard interval using 72 sample clock cycles (i.e., the guard interval is reduced from 16 to 8 sample clock cycles). If the receiving device is not aware of the change in the guard interval length, the integration period will remain once every 80 samples. Therefore, while the receiving device may continue to implement phase and duration offset compensation techniques every integration period, the data of subsequent OFDM symbols will not be interpreted correctly (i.e., the data bits of a first symbol will be confused with the data bits of a second symbol and vice versa).

Therefore, in embodiments of the invention, the receiving device is able to detect when the transmitting device is going to implement a change of guard interval length. For example, the devices 110A and 110B may implement the communication techniques described in U.S. Ser. No. 10/744,864, filed Dec. 23, 2003 and entitled "METHODS AND SYSTEMS FOR MULTI-PROTOCOL COMMUNICATION" and U.S. Ser. No. 10/779,131, filed Feb. 13, 2004 and entitled "METHODS AND SYSTEMS FOR IMPLEMENTING A PSEUDO-NOISE SIGNALING MECHANISM IN WIRELESS COMMUNICATION," which are hereby incorporated by reference. Once the receiving device has determined that the transmitting device will change the guard interval, the integration period may be adjusted accordingly.

Figure 3:
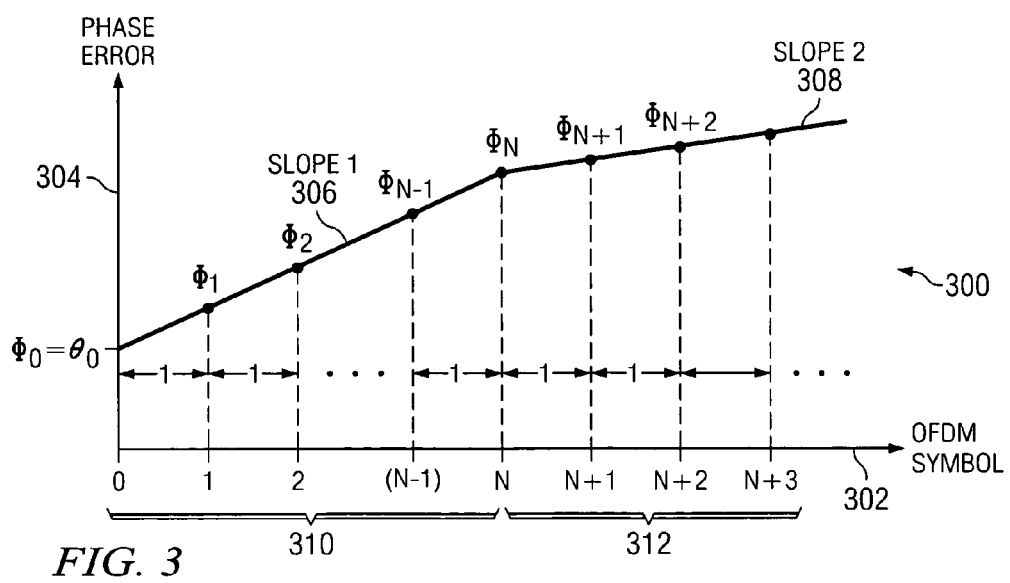
FIG. 3 illustrates a graph 300 showing phase error as a function of a series of transmitted symbols.

FIG. 3 illustrates a graph 300 showing phase error 304 as a function of a series of transmitted symbols 302. In particular, the graph 300 illustrates varying amounts of phase error when transmitted symbols 302 have different durations (e.g., when guard intervals vary in duration). As shown in FIG. 3, at transmitted symbol "0," the phase $\phi_0$ may be equal to an initial value $\theta_0$. As previously mentioned, the initial phase offset, $\theta_0$, may represent an initial phase error between the sampling frequencies and/or carrier frequencies of a transmitting device and a receiving device. FIG. 3 further illustrates a first group of transmitted symbols 310 for which the phase error 304 increases at a constant rate defined by slope1 306. The first group of transmitted symbols 310 (i.e., symbols 0 to N−1) may be associated with a first guard interval as described previously.

FIG. 3 further illustrates a second group of transmitted symbols 312 for which the phase error 304 increases at a constant rate defined by slope2 308. The second group of transmitted symbols 312 may each be associated with a second guard interval as previously described. As shown, the slope1 306 is steeper than the slope2 308 (i.e., after the transmitted symbol N, the amount of phase shift per transmitted symbol decreases). Therefore, FIG. 3 illustrates that the amount of phase error per transmitted symbol may decrease when transmitted symbols implement shorter guard interval lengths. In at least some embodiments, the change in slope may by attributed to a change in the integration period (i.e., there is less phase error per transmitted symbol when the integration period is once every 72 samples rather than once every 80 samples).

There is not necessarily an undesirable amount of phase error 304 per OFDM symbol 302. However, a receiving device needs to accurately compensate for the amount of phase error 304 per OFDM symbol 302 so that the data transmitted with each information symbol can be recovered. Therefore, if the amount of phase error 304 per OFDM symbol 302 changes (as shown by slope1 306 and slope2 308 in FIG. 3), a receiving device needs to implement a mechanism to estimate and correct such changes.

FIG. 4A illustrates a block diagram of a receiver 400 in accordance with preferred embodiments of the invention. As shown in FIG. 4a, the receiver 400 may comprise offset adjust logic 406 coupled between a frequency equalizer 404 and a constellation de-mapper 408. The receiver 400 may further comprise cyclic prefix remover 409 coupled to an FFT (Fast Fourier Transform) block 402. The FFT block 402 may provide input to the frequency equalizer 404.

As shown, the cyclic prefix remover 409 may receive carrier signal samples. The carrier signal samples may comprise a discrete time representation of the transmitted sub-carrier signals. The cyclic prefix remover 409 may be configured to remove a predetermined number of samples for each transmitted symbol according to a cyclic prefix control signal 407. Preferably, the cyclic prefix control signal 407 may be adjusted when changes are made to the guard interval length associated with each transmitted symbol. If the cyclic prefix remover 409 is not configured correctly, an incorrect amount of samples may be thrown away. In at least some embodiments, the cyclic prefix control signal 407 is operable to update the cyclic prefix remover 409 such that the samples associated with neighboring transmitted symbols having different guard intervals are "trimmed" correctly. After the extraneous samples have been removed, the remaining samples are forwarded to the FFT block 402 which extracts frequency spectrum data from the wireless signal samples and outputs the frequency spectrum data to the frequency equalizer 404. The frequency equalizer 404 removes interference caused by the communication channel and outputs "equalized" frequency spectrum data to the offset adjust logic 406. The offset adjust logic 406 estimates the initial and continuing phase error caused by the sample frequency offsets and carrier frequency offsets described previously. The offset adjust logic 406 also preferably compensates for these offsets. The offset adjust logic 406 may then output the frequency spectrum data (including adjustment and compensation) to a constellation de-mapper 408 which converts the frequency spectrum data to information symbols that can be decoded by a decoder.

FIG. 4B illustrates an embodiment of the offset adjust logic 406 that may be implemented with the receiver 400 of FIG. 4A. As shown in FIG. 4B, the offset adjust logic 406 may comprise a processor 410 coupled to a memory 412. The memory 412 may store offset estimation instructions 414 and offset correction instructions 416.

When executed by the processor 410, the offset estimation instructions 414 preferably cause the processor 410 to measure or estimate a phase ($\phi_i$) associated with each transmitted symbol. The phase associated with each information symbol may be described in equation (1) shown below:

$$\Phi_i = \begin{array}{ll} SLOPE*TIME*i + \theta_0, & \text{for } 0 \leq i \leq N \\ SLOPE*TIME*(N + \alpha(i-N)) + \theta_0, & \text{for } i \geq N \end{array} \quad (1)$$

In equation (1), $\phi_i$ is a phase ($\phi$) associated with a symbol index (i). The SLOPE variable may be representative of a phase shift per transmitted symbol slope value such as value of SLOPE1 306 shown and described for FIG. 3. The TIME variable may be representative of a time duration of each transmitted symbol. The i variable may be a number value (0, 1, 2, 3, etc.) associated with each transmitted symbol. The $\theta_0$ variable may comprise an initial phase offset between sample frequency clock periods or carrier frequency clock periods of a transmitting device and a receiving device as previously described. The a variable may comprise the time duration per transmitted symbol starting at sample N divided by the time duration per transmitted symbol before the sample N (e.g., TIME2/TIME1). The N variable may comprise the wireless signal symbol index value at which the time duration per transmitted symbol changes.

In at least some embodiments, the processor 410 may measure the phase offsets ($\phi_1$ and $\phi_2$) associated with the transmitted symbols 1 and 2. Using $\phi_1$ and $\phi_2$, an initial phase error per transmitted symbol (e.g., the value of SLOPE1 306) may be calculated as $(\phi_2-\phi_1)/(2-1)=\Delta\phi_{initial}$/symbol. The $\Delta\phi_{initial}$/symbol value may then be used to determine the initial phase offset ($\theta_0$) shown as the location where the SLOPE1 306 intersects the y-axis in FIG. 3. The $\Delta\phi_{initial}$/symbol value may also be used to predict future phase error.

If the error between a predicted phase error and a measured phase error of a subsequent symbol (e.g., $\phi_3$) is less than a threshold amount, the processor 410 does not need to execute the offset correction instructions 416. However, if the error between a predicted phase error and a measured phase error is greater than or equal to a threshold amount, the offset correction instructions 416 may cause the processor 410 to calculate a new phase error per transmitted symbol value (e.g., the SLOPE2 308 value). For example, the processor 410 may detect that a predicted value of $\phi_{N+1}$ based on the SLOPE1 306 (shown in FIG. 3) value is offset from a measured value of $\phi_{N+1}$ by more than a threshold amount. Therefore, the offset correction instructions 416 may cause the processor 410 to calculate a new phase error per symbol value such as $\Delta\phi_{new}$/sample=$(\phi_{N+1}-\phi_N)/1$. The $\Delta\phi_{new}$/sample value may then be implemented in equation (1) to predict future phase error (e.g., $\phi_{N+2}$). For example, the value of $\phi_{N+2}$ may be calculated as $\phi_N+(i-N)*\Delta\phi_{new}$/symbol.

The above illustration is exemplary only. There are many possible ways to calculate changes in the phase error per symbol. Preferred embodiments of the invention may implement weighting schemes that give more weight to the most recent errors between predicted phase error values and measured phase error values. For example, an exponentially decaying window (sometimes referred to as a "forgetting factor") may be applied when calculating the phase error per symbol. In such embodiments a new phase error per symbol slope may be calculated by giving more weight to current errors (e.g., errors associated with the last two or three samples) and "forgetting" more distant errors.

To calculate a changing slope, several mathematical operations may be performed. For example, embodiments of the invention may implement least squares (LS) error calculations, linear regression models, matrix operations (e.g., matrix multiplication, matrix inversion, matrix transformations), vector and scalar calculations, linear interpolation, recursive processor and/or iterative processes to calculate changing amounts of phase error between subsequent transmitted symbols. Therefore, the offset estimation instructions 414 and the offset correction instructions 416 may comprise instructions that cause the processor 410 to perform mathematical operations such as those described above. In still other embodiments, phase locked loop circuitry may be implemented to track and correct changing phase error per transmitted symbol values.

In some embodiments, a hardware "state machine" may be implemented in addition to or in place of the processor 410 and the memory 412. In such embodiments, the state machine may sequence through opcodes or instructions that simulate the execution of instructions 414, 416 by the processor 410 as described above with respect to FIG. 4B.

FIG. 5 illustrates a method 500 in accordance with preferred embodiments of the invention. As shown in FIG. 5, the method 500 may comprise receiving a transmitted symbol associated with a first time duration (block 502). The method further comprises receiving a transmitted symbol associated with a second time duration (block 504). Thereafter, a phase offset per transmitted symbol value is adjusted based on a difference between the first time duration and the second time duration (block 506). Once the phase offset per transmitted symbol value is adjusted at block 506, phase offset may be corrected using the adjusted phase offset per transmitted symbol value (block 508). The method 500 described above may permit wired or wireless devices to communicate using guard intervals of multiple lengths. Accordingly, new or proprietary devices may implement information symbols having shorter guard intervals (or no guard intervals).

The above discussion is meant to be illustrative of the principles and various embodiments of the present invention. Numerous other variations and modifications will become apparent to those skilled in the art once the above disclosure is fully appreciated. It is intended that the following claims be interpreted to embrace all such variations and modifications.

What is claimed is:

1. A system, comprising:
   one or more devices configurable to communicate according to a first protocol that permits interpretation of transmitted data field symbols associated with a first time duration; and
   one or more devices configurable to communicate according to a second protocol that permits interpretation of transmitted data field symbols associated with multiple time durations;
   wherein the one or more devices configurable to communicate according to the second protocol are operable to communicate using transmitted data field symbols associated with the first time duration and to communicate using transmitted data field symbols associated with a time duration that is not supported by the one or more devices configured to communicate according to the first protocol;
   the one or more devices configurable to communicate according to the second protocol transmit a first part of a data packet using transmitted symbols associated with a first guard interval duration and a second part of a data packet using transmitted symbols associated with a guard interval duration that is shorter than the first guard interval duration;
   the one or more devices configurable to communicate according to the second protocol each comprise offset adjust logic that is configured to detect a phase offset between subsequent transmitted symbols;
   the offset adjust logic is configured to adjust a phase offset per transmitted symbol value when subsequent transmitted symbols are associated with different guard interval durations.

2. The system of claim 1 wherein the time duration that is not supported by the one or more devices configured to communicate according to the first protocol is shorter than the first time duration.

3. The system of claim 1 wherein the first part of the data packet comprises a signal field and the second part of the data packet comprises a data field.

4. The system of claim 1 wherein the one or more devices configurable to communicate according to the second protocol each comprise cyclic prefix remover logic that is configured to remove a different amount of samples for each of subsequent transmitted symbols according to a cyclic prefix control signal.

5. The system of claim 4 wherein the different amount of samples for each of the subsequent transmitted symbols are associated with different guard interval lengths.

6. The system of claim 5 wherein the one or more devices configurable to communicate according to the first protocol and the one or more devices configurable to communicate according to the second protocol communicate to each other via wires.

7. The system of claim 5 wherein the one or more devices configurable to communicate according to the first protocol and the one or more devices configurable to communicate according to the second protocol communicate to each other via a wireless medium.

8. The system of claim 1 wherein the offset adjust logic that predicts a phase error associated with a subsequent transmitted symbol based on one or more phase errors associated with preceding transmitted symbols.

9. The system of claim 1 wherein the offset adjust logic is operable to compensate for variable amounts of phase error between transmitted symbols.

10. The system of claim 1 wherein the offset adjust logic predicts a phase of a subsequent transmitted symbol by comparing a measured phase error of a preceding transmitted symbol with a predicted phase error of the preceding transmitted symbol.

11. The system of claim 1 wherein the offset adjust logic implements a linear regression model to predict a phase error associated with a subsequent transmitted symbol.

12. The system of claim 11 wherein the offset adjust logic further implements a recursive least squares technique to predict a phase error associated with a subsequent transmitted symbol.

13. The system of claim 12 wherein the recursive least squares technique comprises a forgetting factor.

14. The system of claim 1 wherein the offset adjust logic comprises a processor coupled to a memory and wherein the memory stores instructions that, when executed by the processor, cause the processor to predict a phase error associated with a subsequent transmitted symbol.

15. The system of claim 14 wherein the instructions, when executed by the processor, further cause the processor to determine a phase error per transmitted symbol value based on the phase errors of at least two received transmitted symbols.

16. The device of claim 14 wherein the instructions, when executed by the processor, further cause the processor to determine an initial phase offset between clock frequencies of the device and clock frequencies of another device.

17. The system of claim 16 wherein the instructions, when executed by the processor, further cause the processor to determine a new phase error per transmitted symbol based on errors between measured phases of transmitted symbols and predicted phases of transmitted symbols.

18. The system of claim 17 wherein the instructions, when executed by the processor, further cause the processor to implement a weighting scheme of the errors to determine the new phase error per transmitted symbol.

19. The system of claim 18 wherein the weighting scheme gives more weight to errors associated with more recently received transmitted symbols.

* * * * *

UNITED STATES PATENT AND TRADEMARK OFFICE
CERTIFICATE OF CORRECTION

| | | |
|---|---|---|
| PATENT NO. | : 7,668,199 B2 | Page 1 of 1 |
| APPLICATION NO. | : 10/870404 | |
| DATED | : February 23, 2010 | |
| INVENTOR(S) | : Troulis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1651 days.

Signed and Sealed this

Twenty-eighth Day of December, 2010

David J. Kappos
*Director of the United States Patent and Trademark Office*